(12) United States Patent
Toutant et al.

(10) Patent No.: US 8,029,219 B2
(45) Date of Patent: Oct. 4, 2011

(54) INTERLOCKING LOAD DIVIDERS FOR UTILITY VEHICLE CARGO BOX

(75) Inventors: John T. Toutant, Waupun, WI (US); Terry L. Zwart, Breezy Point, MN (US)

(73) Assignee: Deere & Company, Moline, IL (US)

( * ) Notice: Subject to any disclaimer, the term of this patent is extended or adjusted under 35 U.S.C. 154(b) by 326 days.

(21) Appl. No.: 12/118,997

(22) Filed: May 12, 2008

(65) Prior Publication Data
US 2009/0279979 A1 Nov. 12, 2009

(51) Int. Cl.
*B61D 45/00* (2006.01)
(52) U.S. Cl. ........................................ 410/129
(58) Field of Classification Search ............. 410/129; 296/24.4, 37.6; 224/42.34, 403, 404, 539, 224/542; 220/529, 532, 533, 552, 553; 248/500, 248/503
See application file for complete search history.

(56) References Cited

U.S. PATENT DOCUMENTS

| | | | | |
|---|---|---|---|---|
| 2,610,759 A * | 9/1952 | Slade | | 220/533 |
| 2,854,724 A * | 10/1958 | Wuorio | | 249/168 |
| 4,573,731 A * | 3/1986 | Knaack et al. | | 296/37.6 |
| 4,577,773 A * | 3/1986 | Bitel | | 220/533 |
| 4,917,429 A * | 4/1990 | Giger | | 296/37.6 |
| 5,265,993 A * | 11/1993 | Wayne | | 410/129 |
| 5,469,999 A * | 11/1995 | Phirippidis | | 224/542 |
| 5,553,710 A * | 9/1996 | Takama | | 206/561 |
| 5,603,559 A * | 2/1997 | Yemini | | 312/333 |
| 5,803,295 A * | 9/1998 | Tussey | | 220/4.31 |
| 5,931,632 A * | 8/1999 | Dongilli et al. | | 414/522 |
| 6,109,847 A * | 8/2000 | Patel et al. | | 410/129 |
| 6,135,527 A * | 10/2000 | Bily | | 296/37.6 |
| 6,138,883 A * | 10/2000 | Jackson et al. | | 224/404 |
| 6,174,116 B1 * | 1/2001 | Brand | | 410/140 |
| 6,206,624 B1 * | 3/2001 | Brandenburg | | 410/132 |
| 6,688,821 B1 * | 2/2004 | Snyder | | 410/140 |
| 6,966,450 B2 * | 11/2005 | Askew | | 220/529 |
| 7,214,018 B2 * | 5/2007 | Lussier | | 410/130 |

* cited by examiner

*Primary Examiner* — H Gutman

(57) ABSTRACT

Interlocking load dividers for a utility vehicle cargo box include a primary load divider with a plurality of notches in its top edge, and one or more secondary load dividers slidably interlocked to the primary load divider. Each secondary load divider has a downwardly facing L-hook interlocking with one of the notches such that the secondary load divider is perpendicular to the primary load divider.

13 Claims, 4 Drawing Sheets

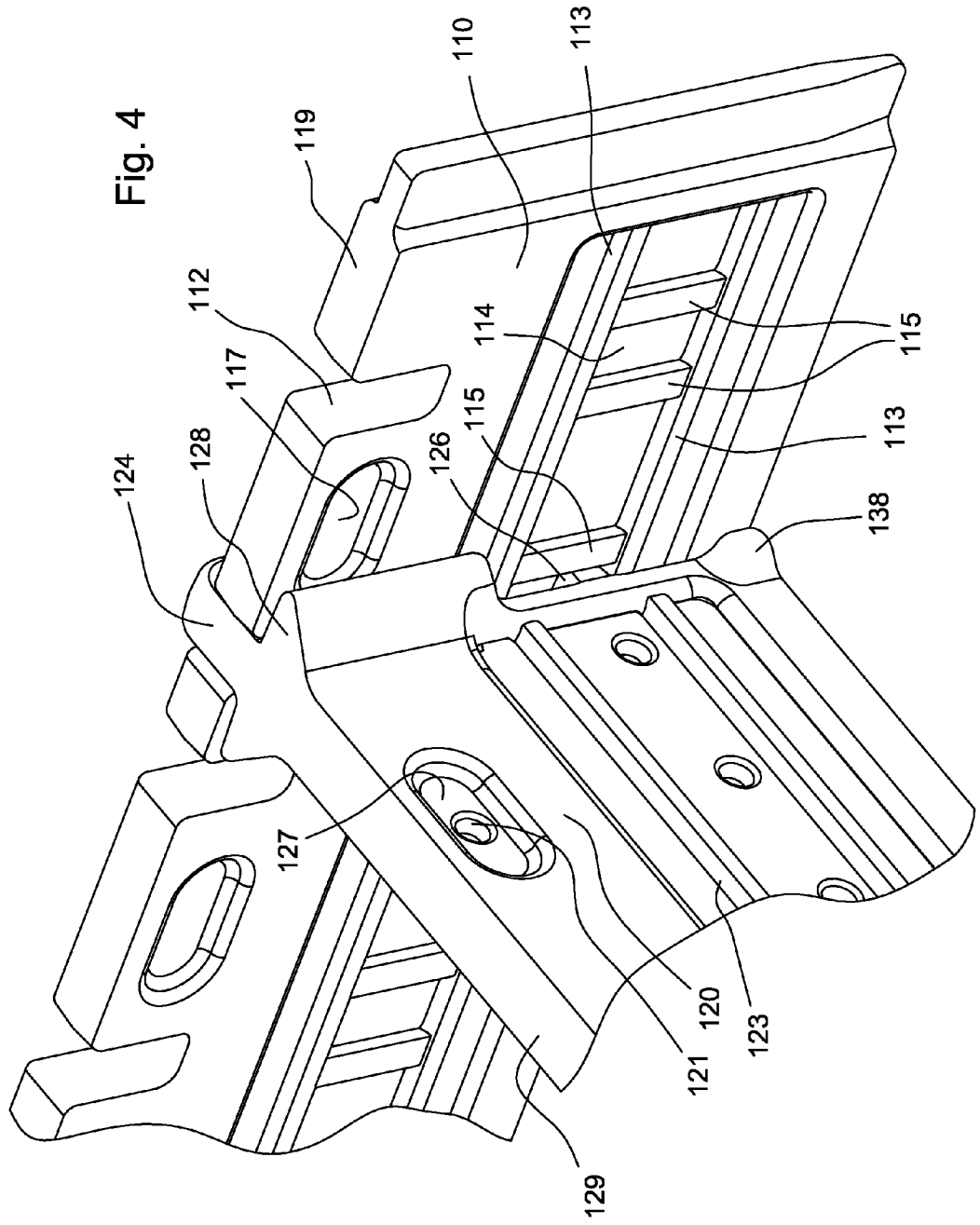

INTERLOCKING LOAD DIVIDERS FOR UTILITY VEHICLE CARGO BOX

FIELD OF THE INVENTION

This invention relates to cargo boxes for off-road utility vehicles used for agricultural, industrial or recreational purposes. More specifically, this invention relates to interlocking load dividers for a utility vehicle cargo box.

BACKGROUND OF THE INVENTION

Off-road utility vehicles are often equipped with cargo boxes for carrying various items including tools, supplies, or material. In the past, utility vehicle cargo boxes have been typically constructed of steel panels for side walls, with a supporting frame under the floor. Load dividers have been mounted to a utility vehicle cargo box, for keeping various loads or tools separated in an organized fashion. Load dividers can be mounted between the opposing side walls, for example, using a bolt-on method, or to holes drilled into each side wall surface. Hardware and tools are required to mount or remove the load divider from the side wall. Load dividers are needed that can be mounted or removed from a side wall without using tools. Load dividers are needed for a utility vehicle cargo box that can be reconfigured to fit different size loads or tools.

Recently, efforts have been made to use composite materials, or other light weight materials such as blow-molded plastics that provide high strength and durability, for utility vehicle cargo boxes. Drilling holes can damage the side walls of a composite utility vehicle cargo box. It is desirable to mount load dividers in a utility vehicle cargo box without damaging the side walls.

SUMMARY OF THE INVENTION

Interlocking load dividers are provided for a utility vehicle cargo box including a primary load divider having a first end, a second end, a top edge with a plurality of notches therein, and a face having a pocket below each of the notches. The first and second ends are removably fastened to the left and right side walls of the cargo box. One or more secondary load dividers are slidably interlocked to the primary load divider by engaging an L-hook and a tab into one of the notches and pockets in the primary load divider.

The load dividers can be mounted or removed from a cargo box of a utility vehicle without using tools, and also can be easily reconfigured to fit different size loads or tools. The load dividers can be mounted to a utility vehicle cargo box without damaging the side walls.

BRIEF DESCRIPTION OF THE DRAWINGS

FIG. 4 is a top perspective view of a pair of interlocking load dividers for a utility vehicle cargo box in one embodiment of the invention.

DESCRIPTION OF THE PREFERRED EMBODIMENT

Figure 1:
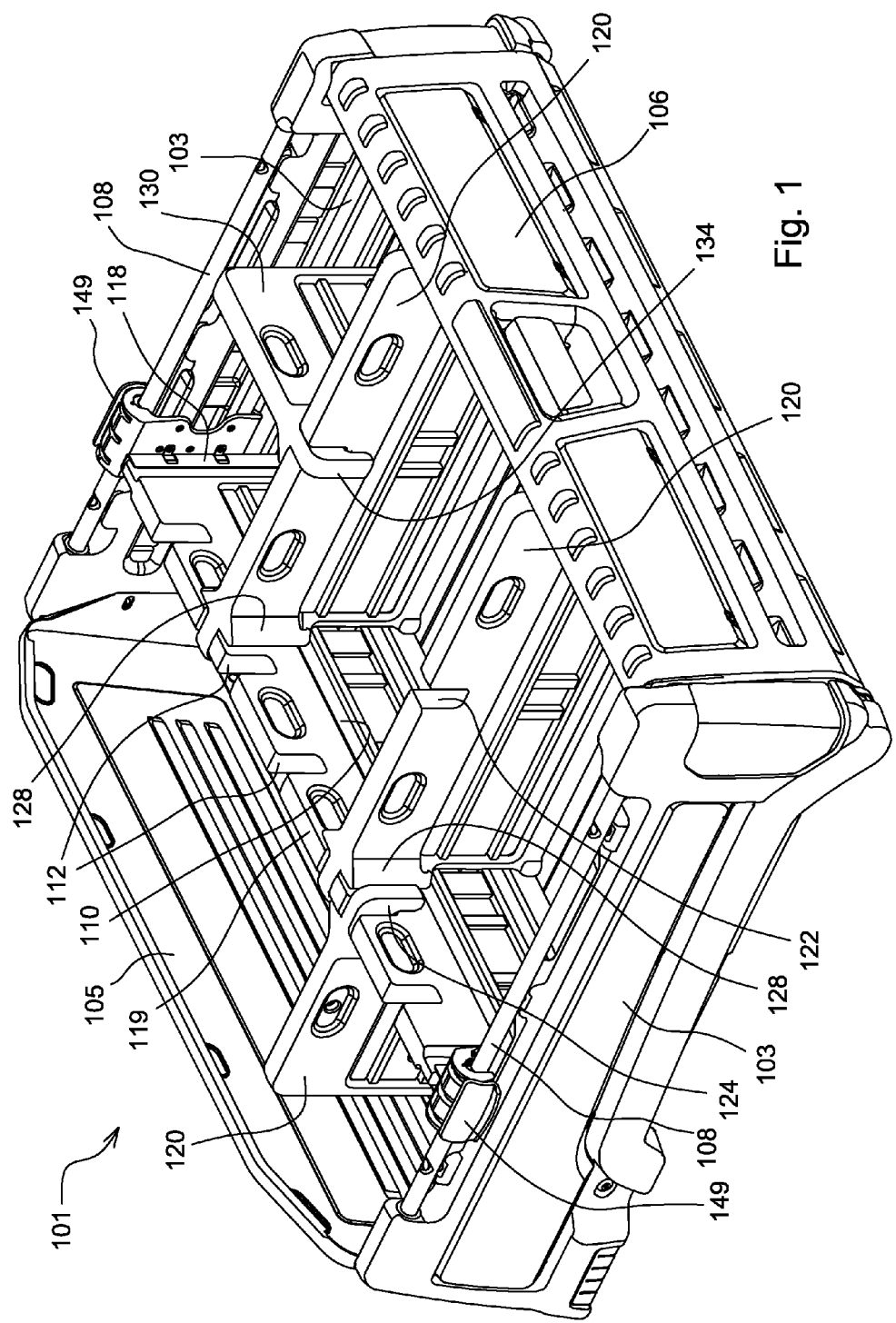
FIG. 1 is a top perspective view of a utility vehicle cargo box with interlocking load dividers according to a first embodiment of the invention.
Figure 2:
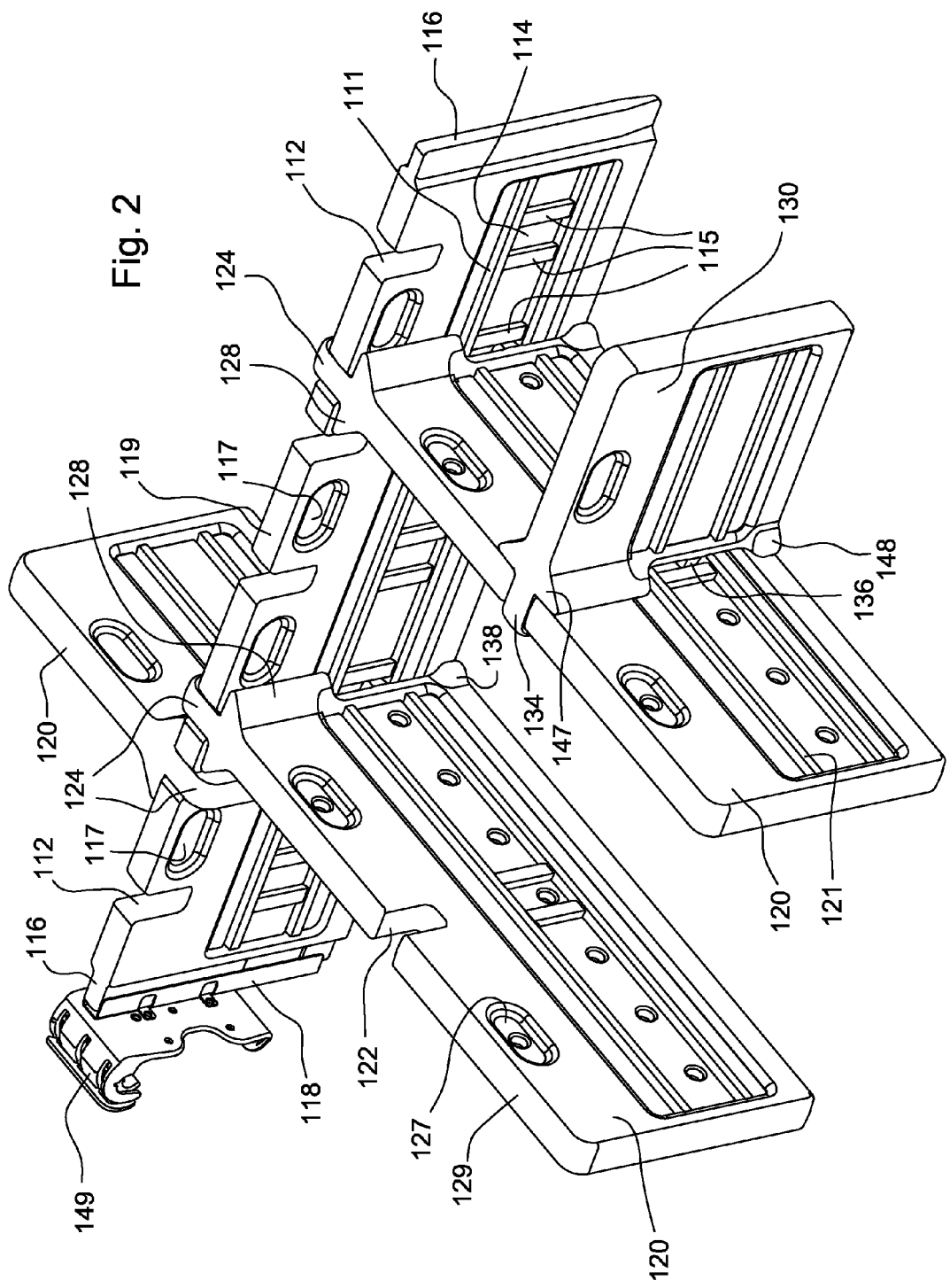
FIG. 2 is a top perspective view of interlocking load dividers for a utility vehicle cargo box according to a first embodiment of the invention.
Figure 3:
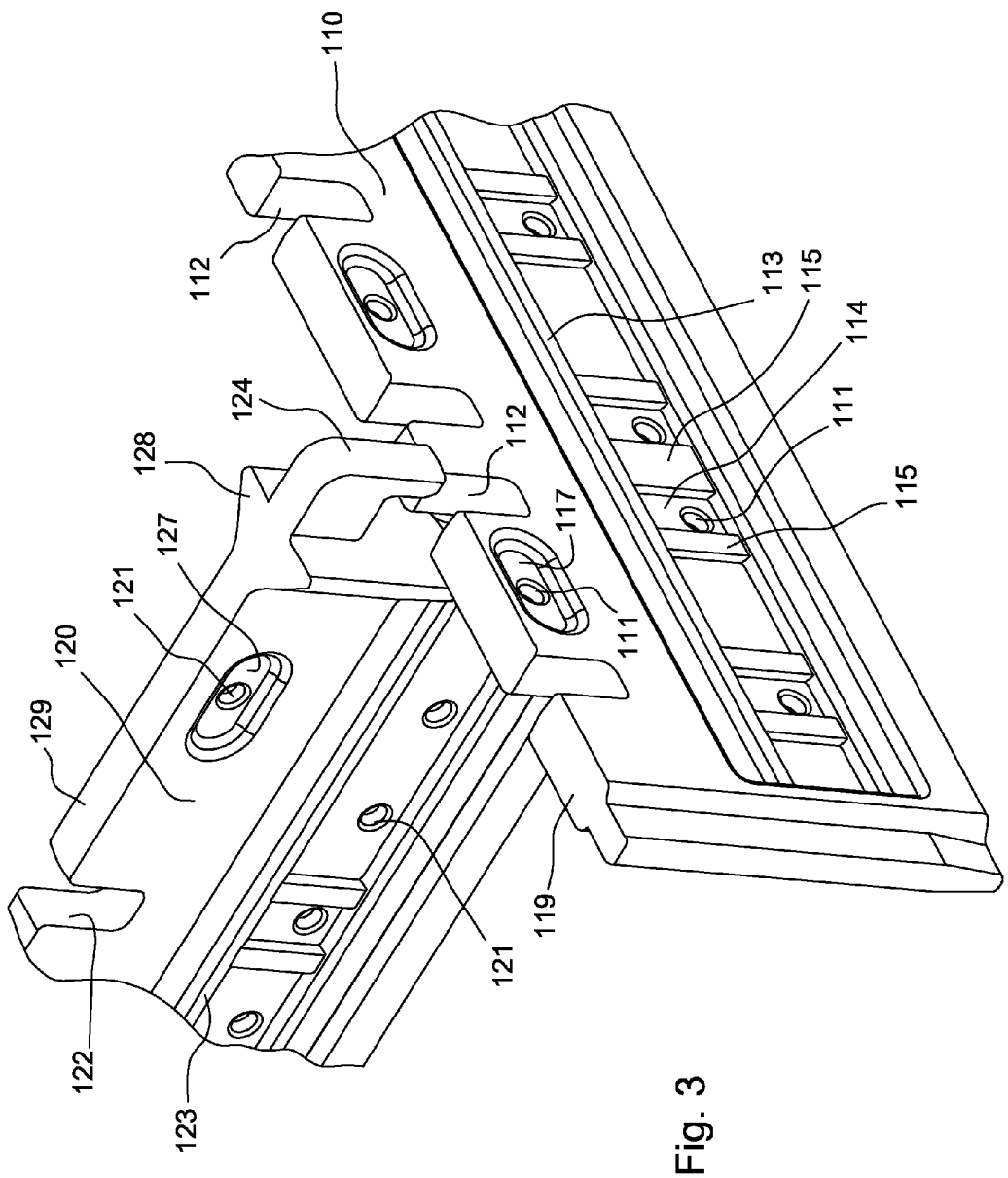
FIG. 3 is a top perspective view of a pair of interlocking load dividers for a utility vehicle cargo box before they are interlocked, in one embodiment of the invention.

In a first embodiment of the invention shown in FIGS. 1-4, utility vehicle cargo box 101 has a pair of opposing side walls 103, load guard 105 at the front of the cargo box, and tail gate 106 at the rear of the cargo box. Preferably, the side walls may be molded from a composite or molded plastic material. Accessory bar 108 may be provided along the top edge of the side wall. Alternatively, the side walls may be steel or any other material that the interlocking load dividers may be fastened to as described below. The tail gate may be hinged to the cargo box. Optionally, the cargo box load guard and tail gate may be composite or molded plastic material, and the cargo box may have a steel or composite floor.

In one embodiment, interlocking load dividers 110, 120, 130 are removably positioned in the utility vehicle cargo box. Preferably, the load dividers are molded from a light weight plastic material such as abrasive resistant cross linked polyethylene. Each load divider may have a thickness of between about one inch and about three inches between its opposing faces, and a generally hollow core or interior. A plurality of supporting structures 111, 121 may extend through the core of the load divider between its faces. The supporting structures may be in the form of passages that also may be used to secure tie-down straps to a load divider. Additionally, one or both faces of a load divider may have one or more strengthening ridges or grooves, such as horizontal ridges or bars 113, 123, and one or more handles or grips 117, 127.

In one embodiment, primary load divider 110 has a plurality of interlock spaces 112 along top edge 119, and secondary load dividers 120 have at least one interlock space 122 along their top edges 129, where other load dividers may be interlocked. The interlock spaces may be notches which are U-shaped cut outs provided in the top edges of the load dividers. Not only are the notches used for interlocking the load dividers together, but they also may be used for positioning and holding long handled tools in place while the tools are carried in the cargo box. Multiple notches may be provided along the top edge of each load divider to permit the load dividers to be interlocked at different locations to provide different configurations in the cargo box. Each load divider may be interlocked perpendicular to another load divider.

In one embodiment, each notch may extend through the thickness of the load divider between its opposing faces, and may have a depth of about one inch and about three inches from the top edge of the load divider. The width of the notch may be substantially the same as the thickness of a load divider that may be interlocked into the notch, as described in more detail below.

In one embodiment, primary load divider 110 extends between opposing side walls 103 of the cargo box. The primary load divider may be attached to the side walls without using tools. Instead, the primary load divider may be attached to the side walls using attachment mounting devices 149 that may be removably attached to the cargo box side walls. For example, an attachment mounting device may be clamped to bar 108 along the top edge of the cargo box sidewall.

In one embodiment, each attachment mounting device 149 may have a vertically aligned channel bracket 118 attached thereto. The end portions 116 of primary load divider 110 may slide into channel brackets 118, securing the load divider to the side walls and preventing fore and aft movement of the load divider. The end portions of the primary load divider may slide into the channel brackets, or be removed therefrom, without using tools. Each channel bracket may have a width of less than the full width of the load divider. Therefore, to fit into the channel brackets, the primary load divider's end portions 116 may have a thickness of less than the load divider's full thickness. Optionally, the load divider's end portions may have a dovetail interlock with the channel brackets.

Thus, the ends of the primary load divider can be attached to the sidewalls of a utility vehicle cargo box without tools. Various securing mechanisms may be used, instead of the attachment mounting devices described and shown herein, that do not damage or permanently deform the cargo box side walls. For example, the ends of a primary load divider, and/or the cargo box side walls, may have tabs or protrusions that interlock with slots or sockets to fasten the ends of the primary load divider to the side walls, preventing fore and aft movement of the primary load divider.

In one embodiment, one or more secondary load dividers 120 can be interlocked to primary load divider 110. Each secondary load divider may have substantially the same thickness and height, but may not be as long as the primary load divider. Each secondary load divider may be connected to the primary load divider with interlocking features that are integrated or molded into the load dividers themselves. Each secondary load divider may be joined to the primary load divider by a sliding interlock into one of the interlock spaces. No tools are required to interlock a secondary load divider to a primary load divider.

In one embodiment, at least one end of each secondary load divider has a downwardly facing L-hook 124 extending therefrom. The L-hook may be molded into the end of the secondary load divider adjacent its top edge 129, and may fit into notch 112 at the top edge 119 of a primary load divider. To interlock the secondary load divider to the primary load divider, the operator may insert the end of the secondary load divider into one of the notches in the top edge of the primary load divider such that the L-hook extends through the notch, and then push down the secondary load divider until the end of the L-hook fully interlocks into the notch, the L-hook reaching below the notch depth on the opposite face of the primary load divider.

In one embodiment, the same end of a secondary load divider also includes tab 126 to help interlock the load dividers together. The tab may be molded into the end of the secondary load divider and extend from the end between about one half inch and about 1½ inches. The tab may be positioned intermediate the top and bottom edges of the secondary load divider, and may fit into pocket 114 in the face of the primary load divider. The pocket's height may be slightly greater than the tab's height, preferably between about ½ inch and about 1½ inches greater, to aid insertion into or removal of the tab from the pocket. Each of the plurality of pockets 114 in the face of the primary load divider may be bordered by horizontal and vertical ridges or bars 113, 115 so that the pocket has a depth of at least about ½ inch. While an operator moves the L-hook into the notch, he or she also may snap the tab into the pocket to interlock the secondary load divider to the primary load divider.

In one embodiment, the same end of a secondary load divider may include shoulders 128, 138 adjacent the load divider's top and bottom edges. Shoulders 128 may be molded into the secondary load divider on each side of the L-hook. The shoulders help maintain each secondary load divider perpendicular or nearly perpendicular to the primary load divider, while only one end of a secondary load divider is interlocked to a primary load divider.

In one embodiment, one or more tertiary load dividers 130 can be interlocked with secondary load dividers 120. Each tertiary load divider may have substantially the same thickness and height, but a length less than that of the secondary load dividers. Each tertiary load divider may be interlocked to a secondary load divider with the same interlocking features described above that are integrated or molded into the load dividers themselves. No tools are required to interlock a tertiary load divider to a secondary load divider.

In one embodiment, at least one end of each tertiary load divider has a downwardly facing L-hook 134 extending therefrom, which fits into notch 122 in the top edge 129 of a secondary load divider. To interlock a tertiary load divider to a secondary load divider, the operator may follow the same steps described previously. The same end of a tertiary load divider has a tab 136 that helps interlock the load dividers together by fitting the tab into a pocket in the face of the secondary load divider. To interlock the tertiary load divider to a secondary load divider, the operator inserts the L-hook into the notch and snaps the tab into the pocket. The same end of a tertiary load divider may include shoulders 147, 148 to help maintain the tertiary load dividers perpendicular or nearly perpendicular to the secondary load dividers, while only one end of a tertiary load divider is interlocked to a secondary load divider.

Having described a preferred embodiment, it will become apparent that various modifications can be made without departing from the scope of the invention as defined in the accompanying claims.

The invention claimed is:

1. Interlocking load dividers for a utility vehicle cargo box comprising:
   a primary load divider having a plurality of notches molded in a top edge thereof, a pocket in a face thereof, and removably attached to a left side wall and a right side wall of the cargo box with an attachment mounting device clamped to an outer surface of a bar along a top edge of each side wall and being slidable to any location fore and aft within the cargo box; and
   a secondary load divider having a downwardly facing L-hook molded into the secondary load divider and inserted into one of the notches, a tab molded into the end of the secondary load divider and inserted into the pocket in the face of the primary load divider, and shoulders molded into the secondary load divider adjacent the L-hook, interlocking the secondary load divider to the primary load divider such that the secondary load divider is perpendicular to the primary load divider.

2. The interlocking load dividers of claim 1 wherein the primary load divider and the secondary load divider are molded plastic with a hollow core.

3. The interlocking load dividers of claim 1 wherein the secondary load divider has at least one notch in a top edge thereof.

4. The interlocking load dividers of claim 3 further comprising a tertiary load divider having a downwardly facing L-hook inserted into the at least one notch in the top edge of the secondary load divider and interlocking the tertiary load divider to the secondary load divider such that the tertiary load divider is perpendicular to the secondary load divider.

5. Interlocking load dividers for a utility vehicle cargo box comprising:
   a plurality of hollow molded plastic load dividers in the cargo box; each load divider having a plurality of engaging members integrally molded into a top edge and a face thereof to interlock with another load divider having an end with a hook and a tab inserted into one of the engaging members, and shoulders adjacent the hook to maintain perpendicular alignment between the load dividers; and at least one of the interlocking load dividers extending between a left side wall and a right side wall of the utility vehicle cargo box, and fastened to each side wall by clamping to an outer surface of a bar along a top edge of each side wall.

6. The interlocking load dividers of claim 5 wherein the engaging members are notches in a top edge of at least one of the interlocking load dividers.

7. The interlocking load dividers of claim 6 wherein the engaging members are at least one downwardly facing L-hook molded into an end of one of the interlocking load dividers to slidably interlock into one of the notches.

8. The interlocking load dividers of claim 5 wherein the engaging members are pockets in a face of at least one of the interlocking load dividers.

9. Interlocking load dividers for a utility vehicle cargo box comprising:

a primary load divider having a first end, a second end, a top edge with a plurality of notches therein, and a face having a pocket below each notch; the first end and the second end removably fastened to a left side wall and a right side wall of the cargo box by inserting each end into an attachment mounting device clamped to an outer surface of a bar at any position fore and aft along a top edge of each side wall; and a plurality of secondary load dividers, each secondary load divider having an end with a hook slidably interlocked into one of the notches, a tab slidably engaging one of the pockets in the primary load divider, and shoulders adjacent the hook and abutting the face of the primary load divider in perpendicular alignment thereto.

10. The interlocking load dividers of claim 9 further comprising a downwardly facing L-hook molded into an end of each secondary load divider, the L-hook extending through one of the notches.

11. The interlocking load dividers of claim 10 wherein the attachment device includes a channel bracket into which each end of the primary load divider is slidably inserted.

12. The interlocking load dividers of claim 9 wherein the primary and the secondary load dividers are hollow plastic.

13. The interlocking load dividers of claim 9 further comprising at least one tertiary load divider slidably interlocked to one of the secondary load dividers.

\* \* \* \* \*